(12) United States Patent
Chung

(10) Patent No.: US 9,310,926 B2
(45) Date of Patent: Apr. 12, 2016

(54) TOUCH EVENT PROCESSING METHODS AND APPARATUS FOR PORTABLE DEVICE WITH MULTIPLE OPERATING SYSTEMS

(71) Applicant: Samsung Electronics Co., Ltd., Gyeonggi-do (KR)

(72) Inventor: Seungmin Chung, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 105 days.

(21) Appl. No.: 14/140,107

(22) Filed: Dec. 24, 2013

(65) Prior Publication Data

US 2014/0191994 A1   Jul. 10, 2014

(30) Foreign Application Priority Data

Jan. 8, 2013  (KR) .................. 10-2013-0001894
Feb. 26, 2013  (KR) .................. 10-2013-0020214

(51) Int. Cl.
| | |
|---|---|
| G06F 3/041 | (2006.01) |
| G06F 3/0488 | (2013.01) |
| G06F 3/0483 | (2013.01) |
| G06F 9/455 | (2006.01) |
| G06F 21/53 | (2013.01) |
| G06F 21/74 | (2013.01) |
| G06F 9/46 | (2006.01) |
| G06F 9/54 | (2006.01) |

(52) U.S. Cl.
CPC ............ G06F 3/0416 (2013.01); G06F 3/0483 (2013.01); G06F 3/0488 (2013.01); G06F 3/04883 (2013.01); G06F 9/45533 (2013.01); G06F 9/468 (2013.01); G06F 9/545 (2013.01); G06F 21/53 (2013.01); G06F 21/74 (2013.01)

(58) Field of Classification Search
CPC ..... G06F 4/45533; G06F 21/26; G06F 21/53; G06F 21/74; G06F 3/0488
See application file for complete search history.

(56) References Cited

U.S. PATENT DOCUMENTS

| | | | |
|---|---|---|---|
| 6,630,896 | B1 | 10/2003 | Nathan |
| 8,924,970 | B2 * | 12/2014 | Newell ............................. 718/1 |
| 2002/0173344 | A1 | 11/2002 | Cupps et al. |
| 2009/0089569 | A1 | 4/2009 | Baribault et al. |
| 2011/0185319 | A1 | 7/2011 | Carapelli |
| 2012/0060128 | A1 | 3/2012 | Miller et al. |
| 2012/0198480 | A1 * | 8/2012 | Yasaki et al. .................. 719/319 |
| 2012/0299831 | A1 | 11/2012 | Lioy |

FOREIGN PATENT DOCUMENTS

| | | | | |
|---|---|---|---|---|
| CN | 101997960 A | * | 3/2011 | ............ H04M 1/725 |
| EP | 2 034 405 A1 | | 3/2009 | |
| EP | 2 469 813 A1 | | 6/2012 | |
| KR | 10-2010-0058583 A | | 6/2010 | |
| WO | 2011/051757 A1 | | 5/2011 | |

* cited by examiner

Primary Examiner — Larry Sternbane
(74) Attorney, Agent, or Firm — Cha & Reiter, LLC

(57) ABSTRACT

A touch event processing method and a portable device implementing the same is provided for protecting a touch event occurring on a touch screen from hacking. Touch coordinates from a touch panel are first provided to the first operating system. It is then determined whether a function corresponding to the touch coordinates is to execute a security application. If so, a touch event processing right handover message is transmitted from the first operating system to the second, to hand over a right of processing a touch event that occurs on the touch panel to the second operating system.

18 Claims, 8 Drawing Sheets

TOUCH EVENT PROCESSING METHODS AND APPARATUS FOR PORTABLE DEVICE WITH MULTIPLE OPERATING SYSTEMS

CLAIM OF PRIORITY

This application claims priority under 35 U.S.C. 119(a) to applications filed in the Korean Intellectual Property Office on Jan. 8, 2013 and Feb. 26, 2013, and assigned Serial Nos. 10-2013-0001894, and 10-2013-0020214, respectively, the contents of which are incorporated herein by reference.

BACKGROUND

1. Technical Field

The present disclosure relates to portable electronic devices, and more particularly, to a touch event processing method in a portable device for preventing hacking of a touch event that occurs on a touch screen of the portable device.

2. Description of the Related Art

With the popularity of Internet access, recent portable devices (mobile terminals) such as smart phones and tablets equipped with a radio communication module are being used for exchanging sensitive information with a web server through the Internet. Particularly, electronic settlement and Internet banking information are now commonly exchanged via mobile terminals. For example, in order to complete the purchase of a product at an online shopping mall using a mobile terminal, the user sends security information (e.g. account number, credit card number, and password) to a web server through the electronic settlement procedure. For a mobile terminal equipped with a touchscreen, the security information may be entered through the touchscreen. For this purpose, the terminal displays a keypad on the screen to receive the security information from the user. If the security information is leaked and used by others illegally, this may cause significant property damage.

Meanwhile, Multi-Operating System (OS) is a technology used in the server environment. Recently, this technology has been adopted in the mobile environment for providing security. The conventional multi-Operating System includes a host (main or normal) OS and at least one guest (sub) OS dependent on the host OS and responsible for security. In this host-guest relationship, the guest OS receives the security information from the host OS and thereafter processes the security information. However, if a hacking program is installed in the mobile terminal and runs on the host OS, the touch event generated on the touchscreen may be hacked in the process of being transferred to the guest OS. That is, the conventional multi-OS mobile terminal is vulnerable to the leakage of sensitive touch event information through hacking of the host OS.

SUMMARY

Embodiments disclosed herein address the touch event hacking problem caused by the vulnerability of the host OS in a portable device utilizing multi-OS technology. Disclosed embodiments aim to provide a method for protecting touch events from the hacking attack and a portable device implementing the same in such a way of allowing the OSs to control the touch panel independently.

In an exemplary touch event processing method in a portable device having multiple operating systems, touch coordinates from a touch panel are first provided to a first (e.g., main) operating system. It is then determined whether a function corresponding to the touch coordinates is to execute a security application. If so, a touch event processing right handover message is transmitted from the first operating system to a second operating system, to hand over a right of processing a touch event that occurs on the touch panel to the second operating system.

In accordance with another aspect, a touch event processing method of a portable device having first and second operating systems includes receiving, at the second operating system, touch coordinates from a touch panel; determining whether the touch coordinates are the coordinates in a security image displayed on a screen; and transmitting, when the touch coordinates are not the coordinates in the security image, a touch event processing right handover message for handover of a right of processing a touch event that occurs on the touch panel to the first operating system.

In accordance with another aspect, a touch event processing method of a portable device having multiple operating systems includes receiving an interrupt from a touch panel; determining an operating system having a right of processing a touch event among the multiple operating systems; transmitting the interrupt to the operating system having the right of processing the touch event; and transmitting the touch coordinates to the operating system to which the interrupt was transmitted, in response to a touch coordinates request message received from that operating system.

In accordance with an aspect, a portable device includes a touchscreen having a display panel and a touch panel; a memory for storing a security application and a first and second operating systems; and a Central Processing Unit (CPU) which accesses the memory to execute the first and second operating systems The first operating system receives touch coordinates from a touch panel, and transmits, when a function corresponding to the touch coordinates is to execute a security application, a touch event processing right handover message for handover of a right of processing a touch event on the touch panel to the second operating system.

DETAILED DESCRIPTION

Figure 1:
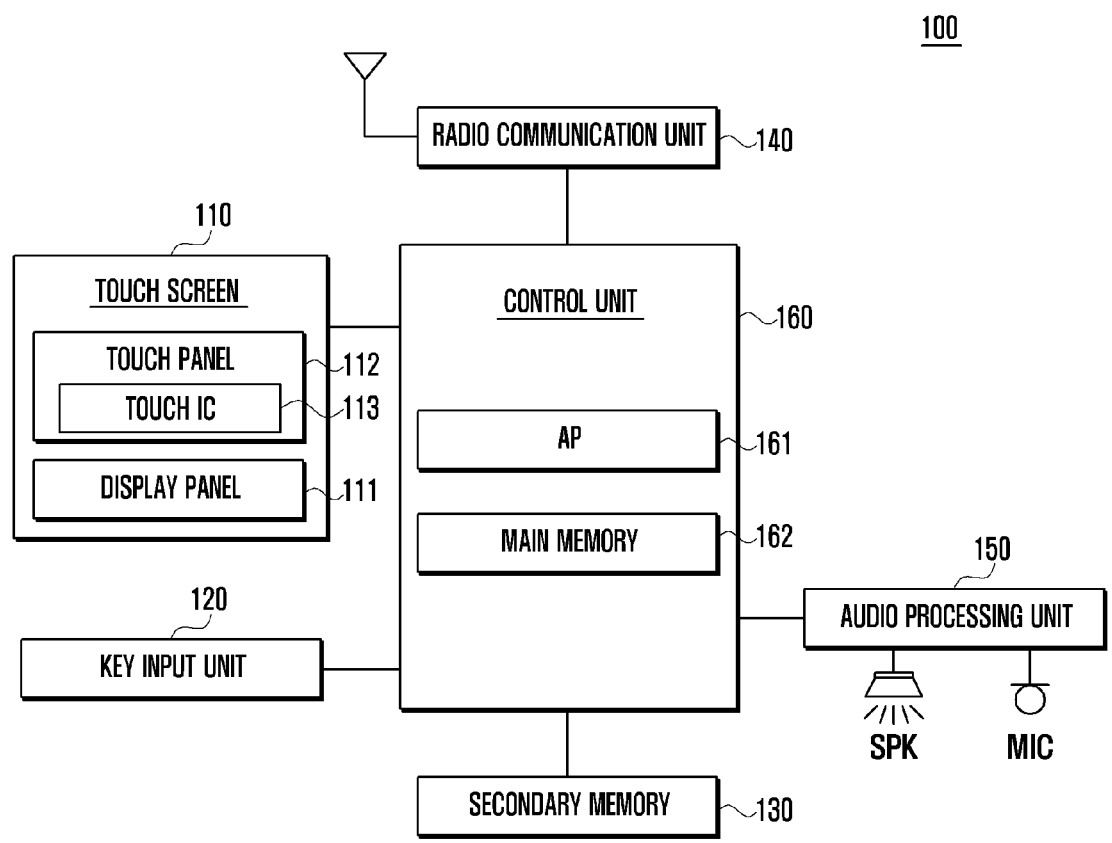
FIG. 1 is a block diagram illustrating a configuration of the portable device according to an embodiment of the present invention.

Exemplary embodiments will now be described with reference to the accompanying drawings, in which like reference numerals indicate like elements or features. In the following description and claims that follow, the terms and words used are not limited to the bibliographical meanings, but, are merely used by the inventor to enable a clear and consistent understanding of the disclosed technology. Accordingly, it should be apparent to those skilled in the art that the following description of exemplary embodiments of the present invention are provided for illustration purpose only and not for the purpose of limiting the invention as defined by the appended claims and their equivalents. In the drawings, certain elements may be exaggerated or omitted or schematically depicted for clarity of illustration, and the actual sizes of the elements are not reflected. Thus, the present invention is not limited by a relative size or distance in the attached drawings. Detailed description of well-known functions and structures incorporated herein may be omitted to avoid obscuring the subject matter described herein.

In this disclosure, a "portable device" can be any of various electronic devices such as a handheld device embodied as a smartphone, a tablet computer, a laptop computer, or a digital camera. A portable device with a communication function can also be called a mobile terminal. Embodiments of touch event processing methods performed within a portable device, and a portable device for implementing the same are described hereinafter.

FIG. 1 is a block diagram illustrating a configuration of an exemplary portable device, 100, according to an embodiment of the present invention. Portable device 100 includes a display unit embodied as a touchscreen 110, a key input unit 120, a secondary memory unit 130, a radio communication unit 140, an audio processing unit 150, a speaker (SPK), a microphone (MIC), and a control unit 160.

The touchscreen 110 includes a display panel 111 and a touch panel 112. Display panel 111 displays data on its screen under the control of the control unit 160. That is, the control unit 160 processes the data (e.g. decodes and resizes retrieved data), buffers the processed data in a buffer. Display panel 111 converts the buffered data to analog signals to selectively drive pixels and thereby form an image according to the data on the screen. When touchscreen 110 powers on, the display panel 111 displays a lock image on the screen. If unlock information is inputted in the state of displaying the lock image, the control unit 160 unlocks the screen, whereby a "home screen" is displayed instead of the lock image. The home screen includes a background image (e.g. photo selected by the user) and a plurality of icons arranged on the photo. Here, the icons represent corresponding applications ("apps") and contents (e.g. photo file, video file, recording file, document, and message). If the user selects one of the icons representing a sensitive information app, e.g., a banking application icon, the control unit 190 executes the banking application and controls the display panel 111 to display the execution image (e.g. a secure keypad).

The touchscreen 110 displays plural images which may be presented in a multi-layer structure where a foreground image appears superposed with a background image, under the control of the control unit 160. For example, in the banking app, the display panel 111 displays a first preview image (e.g. the home image or other background generated while the banking app is executed) on the screen as a background image. A second preview image (e.g. the secure keypad) may be displayed superposed on the first image. The first preview image may be displayed as a background image on the entire area of the screen, and the second preview image may be displayed as a foreground image on a partial area of the screen. Accordingly, in this case the second preview image is viewable entirely and the first image is only partially viewable. In another implementation, the second image is displayed on the entire area of the screen. Here, the second image can be displayed transparently or semi-transparently so that the user can also see the first preview image entirely (beneath the second image). In yet another design, the two preview images can be separated from one another such that each is displayed on the top most layer (i.e., foreground) of the screen. That is, the touchscreen 110 is controlled to display the first image on a first area of the screen and the second image on a different, second area of the screen without overlap therebetween.

The above discussion involved examples of first and second preview images. In addition, the display panel 111 can be also controlled to continuously display a certain image, e.g. an Internet banking application execution image, on the top layer of the screen. That is, while the Internet banking application is running, its execution image is displayed on the top layer of the overall screen image. For example, a web browser is executed by the user and thus a webpage is displayed on the screen. At this time, a secure keypad is displayed on a higher layer than that of the webpage (e.g., secure keypad in foreground, webpage in background). Note that if the "always on top" function is turned off, the images can be on the foreground and background selectively.

Figure 4:
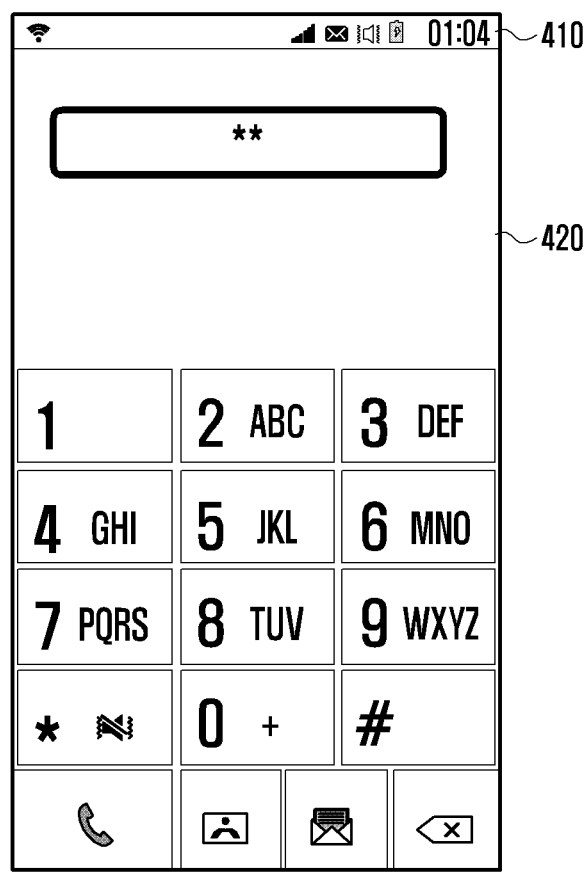
FIG. 4 is a diagram illustrating an exemplary screen display for explaining the touch event processing method of FIG. 3.

Referring momentarily to FIG. 4, an example of a first image displayable by the display panel 111 is an indicator region image 410, which includes indicators for residual battery capacity, current time, etc. The first image is displayed on the above-noted first area. A second image 420, e.g. a secure keypad, is displayed on the second area without overlapping the first image.

The display panel 111 may be implemented e.g. as Liquid Crystal Display (LCD), Organic Light Emitted Diode (OLED), Active Matrix Organic Light Emitted Diode (AMOLED), or flexible display.

The touch panel 112 is mounted on the surface of the display panel 111. More specifically, the touch panel 112 can be placed on the surface of the display panel 111 in an add-on type or inserted into the display unit 110 in an on-cell or in-cell type.

The touch panel 112 generates an analog input signal (representing a touch event) in response to a user's gesture made on the touch panel 112. (Herein, "gesture" can refer to either a single point touch, or multi-point touch, or a drag from the initial touch point or points.) The touch IC (Integrated Circuit) 113 of the touch panel 112 performs Analog/Digital (A/D) conversion on the analog signal to generate a digital signal to the control unit 160. Here, the input signal includes the touch coordinates (x, y). For example, the touch IC 113 determines representative coordinates among plural touch coordinates and transfers the representative touch coordinates to the control unit 160. This control for this operation may be performed by the control unit 160. The touch coordinates may be pixel coordinates. For example, if the screen resolution is 640 (number of pixels in horizontal direction) *480 (number of pixels in vertical direction), the X axis coordinate can range from (0 to 640) and the Y axis coordinates range from (0 to 480). If the touch coordinates are received from the touch IC 113 the control unit 160 determines that a touch gesture has been made on the touch panel 112 with a touch implement (e.g. finger or pen) and, if the touch coordinates are received no longer, the touch has been released. If the coordinates are changed, e.g. from (x0, y0) to (x1, y1), and the displacement (e.g., $D(D^2=(x0-x1)^2+(y0-y1)^2)$ is greater than a movement threshold (e.g. 1 millimeter), the control unit 160 determines that the touch has moved. If touch movement is detected, the control unit 160 calculates the touch displacement (dx, dy) and movement speed of the touch. The control unit 160 can differentiate among user's touch gestures of single touch, multi-touch, tap, double tap, long tap, tap & touch, drag, flick, press, pinch in, and pinch out, based on the touch coordinates, touch release, touch movement, touch displacement, touch speed, etc.

The touch panel 112 can be an integrated touch panel including a hand touch panel for detecting a hand gesture and a pen touch panel for detecting a pen gesture. Here, the hand touch panel is preferably implemented as a capacitive type; however, other types are possible, e.g., resistive, infrared, or microwave types. The hand touch panel is capable of detecting the touch event made by means of an object (e.g. a conductive material object capable of influencing capacitance in a circuit) as well as that of a user's hand. The pen touch panel can be implemented as an electromagnetic induction type. In this case, the pen touch panel detects the touch event made by means of a stylus pen manufactured to form a magnetic field.

The key input unit 120 includes a plurality of alphanumeric keys (virtual and/or physical) for inputting alphanumeric information and function keys for configuring and setting various functions. These keys may include a menu key, a screen on/off key, a power on/off key, a volume control key, etc. The key input unit 120 is capable of generating a key event signal related to the user setting and function control of the portable device 100 to the control unit 160. The key event is capable of a power on/off event, a volume control event, a screen on/off event, a shutter event, etc. The control unit 160 is capable of controlling the components in response to the key event. The physical keys, if provided, of the key input unit 120 are referred to as hard keys while the virtual keys displayed by the display panel 111 are referred to as soft keys.

The secondary memory unit 130 may be implemented with at least one of a disk, Random Access Memory (RAM), Read Only Memory (ROM), and flash memory. The secondary memory unit 130 stores the data generated in the portable device 100 and received from external devices (e.g. server, desktop PC, and tablet PC) through the radio communication unit 140 under the control of the control unit 160.

The secondary memory unit 130 stores a booting program, Operating Systems (OSs), an OS monitor and other application programs. When portable device 100 powers on, the booting program is loaded on the main memory unit of the control unit 160. The booting program loads one of the OSs on the memory. The OS provides the interface between the hardware and applications and among the applications, and the AP 161 manages the hardware components such as main memory unit 162 and secondary memory unit 130.

According to an embodiment of the present invention, the secondary memory unit 130 stores at least two Oss (first and second type OS programs). One of the OSs works as a main OS, and another one works as a sub-OS. According to an embodiment of the present invention, one of Android, Windows, and iOS may be used as the main OS. For example, "MobiCore" (a product of the Giesecke & Devrient (G&D) company) may be used as the sub-OS. Mobicore is a security-enabled OS for secure Internet banking and electronic settlement with a mobile terminal. The OS monitor works as an interface between OSs. For example, "TrustZone" technology of Advance RISC Machines (ARM) Ltd. may be adopted as the OS monitor in some embodiments.

The secondary memory unit 130 also stores the size and display area information on an image (e.g. secure keypad, motion image, or message) to be displayed. Assuming that the screen consists of pixels, the size information is expressed as $x*y$. x denotes the $x^{th}$ pixel on the x axis, and y denotes the $y^{th}$ pixel on the y axis. The display area information can be expressed in four corners coordinates, i.e. (x1, y1), (x2, y1), (x2, y1), and (x2, y2) for an image size of (x2−x1) by (y2−y1). The display area information may alternatively be expressed as a single coordinate (e.g., a central point of a window, where the window size is predetermined).

The radio communication unit 140 is responsible for voice, video, and data communication with another terminal through a network under the control of the control unit 160. The radio communication unit 140 includes an RF transmitter for frequency up-converting and amplifying the signal to be transmitted and an RF receiver for low noise amplifying and down converting the received signal. The radio communication unit 140 includes at least one of a cellular communication module (e.g. $3^{rd}$, $3.5^{th}$, and $4^{th}$ Generation mobile communication modules), a digital broadcast module (e.g. DMB module), and a short range communication module (e.g. Wi-Fi module, Bluetooth module, and Near Field Communication (NFC) module).

The audio processing unit 150 performs speech recognition, voice recording, and audio signal (e.g. voice) input and output for digital recording and call processing in cooperation with a speaker (SPK) and a microphone (MIC). The audio processing unit 150 converts the analog audio signal input through the microphone (MIC) to the digital audio signal and sends the digital audio signal to the control unit 160. The speaker (SPK) converts the audio signal from the audio processing unit 150 to an audible sound wave. The microphone (MIC) converts the sound wave of a human voice or other input sound to the audio signal.

The control unit 160 controls overall operations of the portable device 100, signal flows among the components of portable device 100, and power supply to the components, and processes data. Particularly, touch coordinates are received from the touchscreen 110, and control unit 160 determines the OS to process the touch coordinates. For example, when an internet banking application is executed with a security image (e.g. secure keypad), the sub-OS has the right of processing the touch event (i.e., the sub-OS may directly receive the touch coordinates). If the touch coordinates are those of anon-security image (e.g. a touch on an indicator region), the main OS has the right of processing the touch event. If the security image disappears, the touch event processing right is handed over to the main OS. The touch event processing procedure is described in more detail later.

The control unit 160 controls the display screen of the portable device based on the size information and the display area information on the images stored in the second memory unit 130. For example, if a touch event requesting the display of a secure keypad occurs, the control unit 160 reads the size information and display area information corresponding to the secure keypad from the secondary memory unit 130 and controls the touchscreen 110 to display the secure keypad at the corresponding display area based on the read information. The secure keypad may be displayed on the entire or partial area of the screen.

The control unit 160 includes an Application Processor (AP) 161 that comprises one or more Central Processing Units (CPUs). The CPU is the main control unit of a computing system for performing operations and comparison on data and interpreting and executing commands. The CPU incudes plural registers storing data and commands temporarily. The control unit 160 may include one or more Graphic Processing Units (GPUs). The GPU is the graphic control unit for performing operation and comparison on the graphic data and interpreting and executing commands related to the graphic data. Each of the CPU and GPU can be manufactured as a package of two or more independent cores (e.g. quad-core). The CPU and GPU may be integrated in the form of System on Chip (SoC). The CPU and GPU also may be multilayer-packaged. Note that the structure of the CPU and GPU can be referred to as the AP 161.

The control unit 160 includes a main memory unit 162, e.g. Random Access Memory (RAM). The main memory unit 162 stores various programs loaded from the secondary memory unit 130 such as a booting program, Operating System (OS), and applications. That is, each of the CPUs and GPUs of the control unit 160 accesses a program to interpret program commands and executes a function according to the interpretation result. The main memory 162 includes a cache memory for storing data to be written to the secondary memory unit 130 and read from the secondary memory unit 130 temporarily.

The portable device 100 may further include various components that are not depicted in the drawing such as a camera, an acceleration sensor, a Global Positioning System (GPS) module, a vibration motor, an ear jack, and other accessories. Here, the accessories may be detachable parts of the portable device 100 such as a pen for use in making touch gestures.

Figure 2:
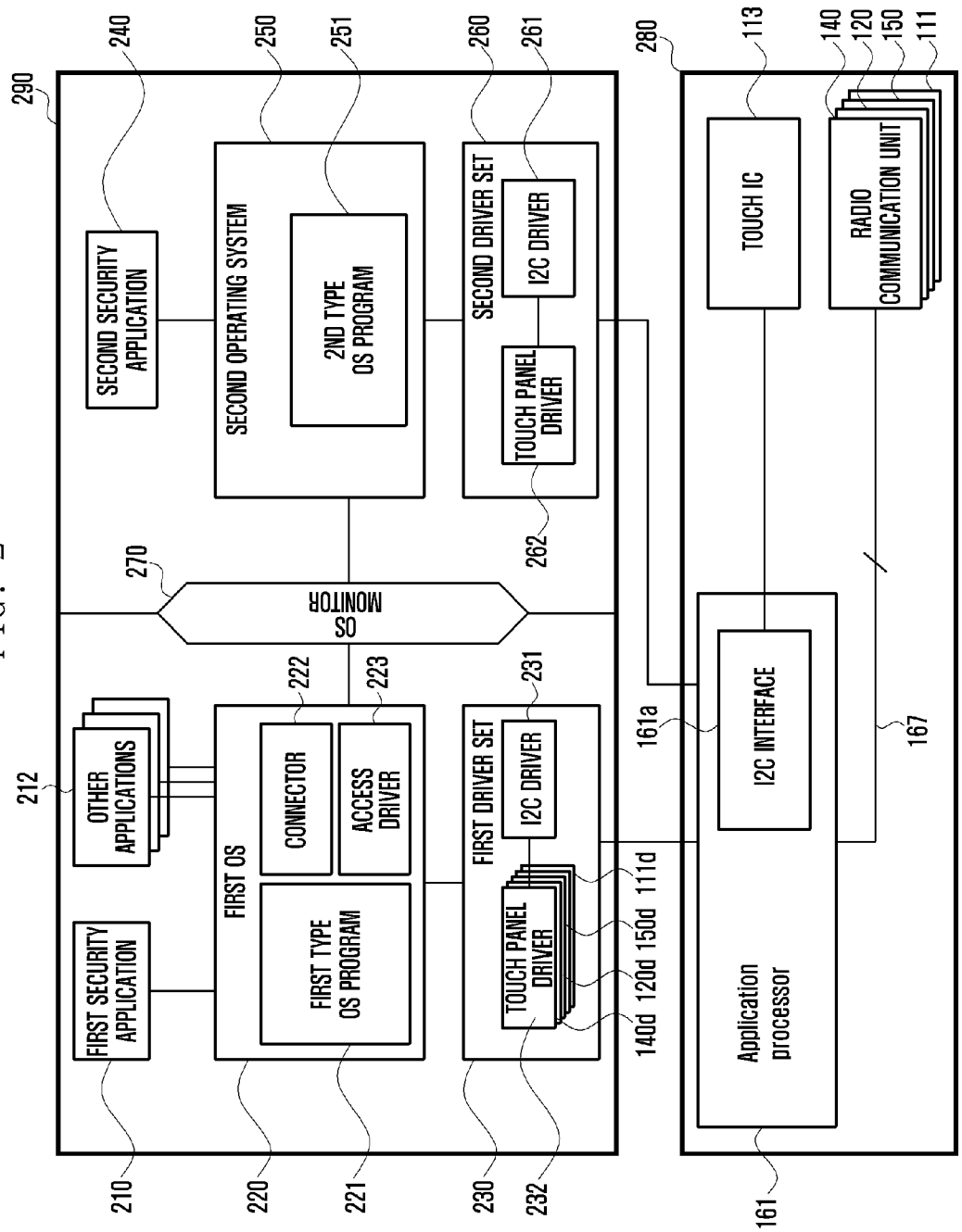
FIG. 2 is a block diagram illustrating a hierarchical structure of the portable device according to an embodiment of the present invention.

FIG. 2 is a block diagram illustrating a hierarchical processing structure of the portable device according to an embodiment of the present invention. The hierarchical structure is arranged schematically as a higher level portion 290 and a lower level portion 280. The higher level 290 includes a first security application 210, a first OS 220, a first driver set 230, a second security application 240, a second OS 250, a second driver set 260, and an OS monitor 270 (e.g., a "TrustZone" monitor mentioned earlier). Each of these elements can be software modules loaded from the secondary memory unit 130 to the main memory 162 during device operation.

In the hierarchical structure, the driver sets 230 and 260 enable operations of the hardware (e.g., the touch screen 110, the radio communication unit 140, the key input unit 120, and the audio processing unit 150). Driver set 230 includes an Inter-integrated circuit (I2C) driver 231 and a touch panel driver 232. Second driver set 260 similarly includes a touch panel driver 262 and an I2C driver 261. The first driver set 230 further includes other peripheral device drivers (e.g. radio communication unit driver 140*d*, a key input unit driver 120*d*, an audio processing unit driver 150*d*, and display panel driver 111*d*). The second driver set 260 includes equivalent device drivers (not shown) to the other peripheral device drivers 111*d*, 120*d*, 140*d*, 150*d*. The peripheral device drivers receive commands from the serving OS and control the input and output of the corresponding peripheral device. (In FIG. 2, multi-connection path 167 illustrates that AP 161 is operatively coupled to each of the radio communication unit 140, key input unit 120, audio processing unit 150 and display panel 111.) The I2C driver 231 (261) controls the input and output of the I2C interface 161*a* of the AP 161. The I2C interface 161*a* transfers the interrupt and touch coordinates received from the touch IC 113 to the driver set of the OS having the touch event processing right. If the OS having the touch event processing right requests the touch coordinates, the I2C interface 161*a* reads the touch coordinates from the internal memory of the touch IC 113 and transfers the touch coordinates to the driver set of the OS having the processing right.

The OSs 220 and 250 exist hierarchically above the respective drive sets 230 and 260 and the OS monitor 270 is interposed between the OSs 220 and 250. The first OS 220 is the main OS of the portable device 100 and includes a first type OS program 221 (e.g., "Android"). The first OS 220 also includes a connector 222 and an access driver 223 for providing an interface with the second OS 250 via the OS Monitor 270. The second OS 250 is the sub-OS and includes a second type OS program 251 (e.g. "MobiCore").

The processing environment further includes the first and second security applications 210 and 240 above the Oss 220 and 250. Here, the first security application 210 is responsible for presenting the security image. For example, if the first OS 220 has the right of processing the current touch event and if the user selects an icon representing the first security application 210, the first OS 220 receives an interrupt from the I2C interface 161*a* through the first driver set 230. In response, the first OS 220 sends the I2C interface 161*a* of the AP 161 a touch coordinate request message. When the touch coordinates are received from the I2C interface 161*a*, the first OS 220 checks the function corresponding to the coordinates. If the checked function is to execute the first security application 210, the first OS 220 loads the first security application 210 onto the main memory unit 162. The loaded first security application commands the first OS 220 to display the security image. In response, the first OS 220 commands the AP 161 to display the security image.

Once the security image is displayed, the second security application 240 is responsible for processing input touch coordinates of a touch event on the security image. With the security image displayed, the second OS 250 has the right of processing a current touch event. That is, in contrast to conventional techniques, instead of the second OS 250 receiving touch coordinates through the first OS 220, the touch coordinates bypass the first OS 220, i.e., they are directly transferred from the AP 161 to the second OS 250. Accordingly, if an interrupt is received from the I2C interface 161*a* through the second driver set 260, the second OS 250 responds by sending the I2C interface 161*a* a touch coordinate request message. When the touch coordinates are received from the I2C interface 161*a*, the second OS 250 determines whether the touch coordinates match the security image coordinates. If so, the second OS 250 sends the touch coordinates to the second security application 240. The second security application 240 encrypts a character (e.g. a number) corresponding to the touch coordinates and commands the second OS 250 to transmit the encrypted information to a secure entity associated with the application, such as an Internet banking server. In an embodiment where the second driver set 260 does not include a radio communication driver 140*d*, the second OS 250 responds by sending the encrypted information to the first OS 220 through the OS monitor 270. Then the first OS controls the AP 161 to transmit the encrypted information to the Internet banking server. Alternatively, if the second driver set 260 is embodied with a radio communication driver 140*d*, the second OS 250 commands the AP 161 to transmit the encrypted information to the Internet banking server directly. The AP 161 controls the radio communication unit 140 to transmit the encrypted information to the Internet banking server.

Besides the first security application 210, other applications 212 exist above the first OS 220 in the upper level 290. The other applications 212 are classified into embedded applications and $3^{rd}$ party applications. For example, the embedded applications include web browser, email application, and instant messenger application. Likewise, other applications (not shown) may exist above the second OS 250, as well as the second security application 240.

Figure 3:
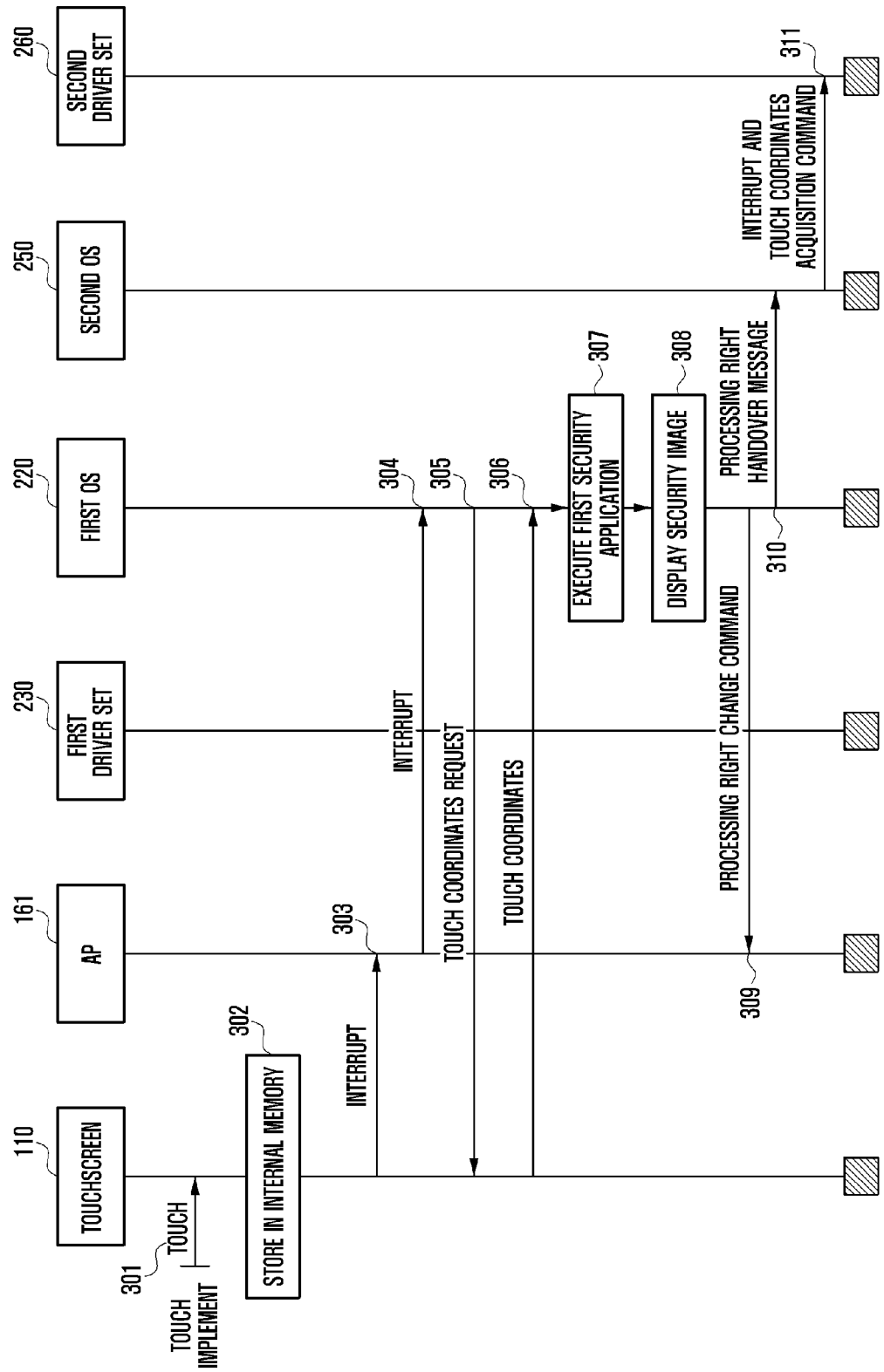
FIG. 3 is a signal flow diagram illustrating a touch event processing method according to an embodiment of the present invention.

FIG. 3 is a signal flow diagram illustrating a touch event processing method according to an embodiment of the present invention. FIG. 4 is a diagram illustrating an exemplary screen display for explaining the touch event processing method of FIG. 3.

Referring to FIGS. 3 and 4, the user makes a touch gesture on the touchscreen 110 with a touch implement at step 301. The touch IC 113 then stores the touch coordinates of the touch gesture in its internal memory at step 302 and generates an interrupt to the AP 161 in order to notify it of the coordinates at step 303.

An indicator indicating the OS having the right of processing the current touch event may be stored in a register of the AP 161. That is, the AP 161 checks the indicator of the register and transmits the interrupt to the OS having the right of processing the touch event at step 304. For instance, an indicator set to 0 can be used to indicate the first OS 220, and an indicator set to 1 indicates the second OS 250. If the indicator is set to 0, the AP 161 transmits the interrupt to the first OS 220 having the right of processing the current touch event. In the example of FIG. 3, the first OS 220 has the processing right, whereby the interrupt is transferred to the first OS 220 at step 304 through the first driver set 230.

Next, in response to the interrupt, at step 305 the first OS 220 sends the touch coordinate request message via first driver set 230 to the touch IC 113 through the I2C interface 161a of AP 161. In response, the touch IC 113 sends the touch coordinates stored in its internal memory to the first OS 220 through the first driver set 230 at step 306. At this time, the touch coordinates are the touch coordinates stored first (i.e., upon the initial touch of the touch event) in the internal memory of the touch IC 113. That is, the first driver set 230 reads the touch coordinates stored earliest among the touch coordinates in the internal memory of the touch IC 113 and sends the read touch coordinates to the first OS 220. If the first OS 220 determines that the touch coordinates correspond to an icon of the first security application, e.g., an Internet banking application, the first security application is launched at step 307. If the touch coordinates are not the coordinates of the first security application icon, the touch coordinates are processed by the first OS according to a predetermined rule. In the former case, the first OS 220 executes the first security application 210 by loading the first security application 210 on the main memory unit 162. When the loading is completed, the first security application 210 commands the first OS 220 to display the security image. The first OS 220 then commands the AP 161 to display the security image at step 308. The AP 161 reads the size and display area information of the security keypad and controls the display panel 111 to display the secure keypad on the corresponding display area based on the read information. In the exemplary case of FIG. 4, the display panel 111 displays the indicator region 410 and the secure keypad 420 under the control of the AP 161. With the secure keypad displayed, the first OS 220 commands the AP 161 to change the processing right at step 309. According to the command, the AP 161 changes the indicator value from 0 to 1 so that the second OS 220 will directly receive subsequent touch coordinates from the AP 161.

After commanding the AP 161 to display the security image, the first OS 220 commands the second OS 250 to receive and process the touch event. That is, the first OS 220 sends the second OS 250 a processing right handover message. The processing right handover message is transferred to the second OS 250 through the OS monitor 270. The second OS 250 commands the second driver set 260 to acquire interrupt and touch coordinates in response to the processing right handover message.

In the above description, it is assumed that during the time that prior to the execution of the first security application, i.e., while the first OS 220 has the touch coordinates processing right, the OS 220 determines whether received touch coordinates correspond to the first security app icon. In an alternative implementation, the first driver set 230 can be configured to make this determination. In this case, if the touch coordinates are the coordinates in the security icon, the first driver set 230 sends the first OS 220 a notification message indicating that the touch coordinates are the coordinates in the security icon. If the notification message is received, the first OS 220 sends the second OS 250 a touch panel processing right handover message for the touch panel 112. The processing right handover message is transferred to the second OS 250 through the OS monitor 270.

In either of the above implementations, when the second OS directly receives touch coordinates, the transmitted touch coordinates may be reused or discarded according to the operation policy of the second OS 250. (Reuse refers to allowing an automatic log-in for convenience of the user.) When the processing right is handed over by the first OS 220, the second OS 250 requests the second driver set 260 for the touch coordinates. In response, the second driver set 260 acquires the touch coordinates from the touch IC 113 and performs a function corresponding to the touch coordinates.

Figure 5:
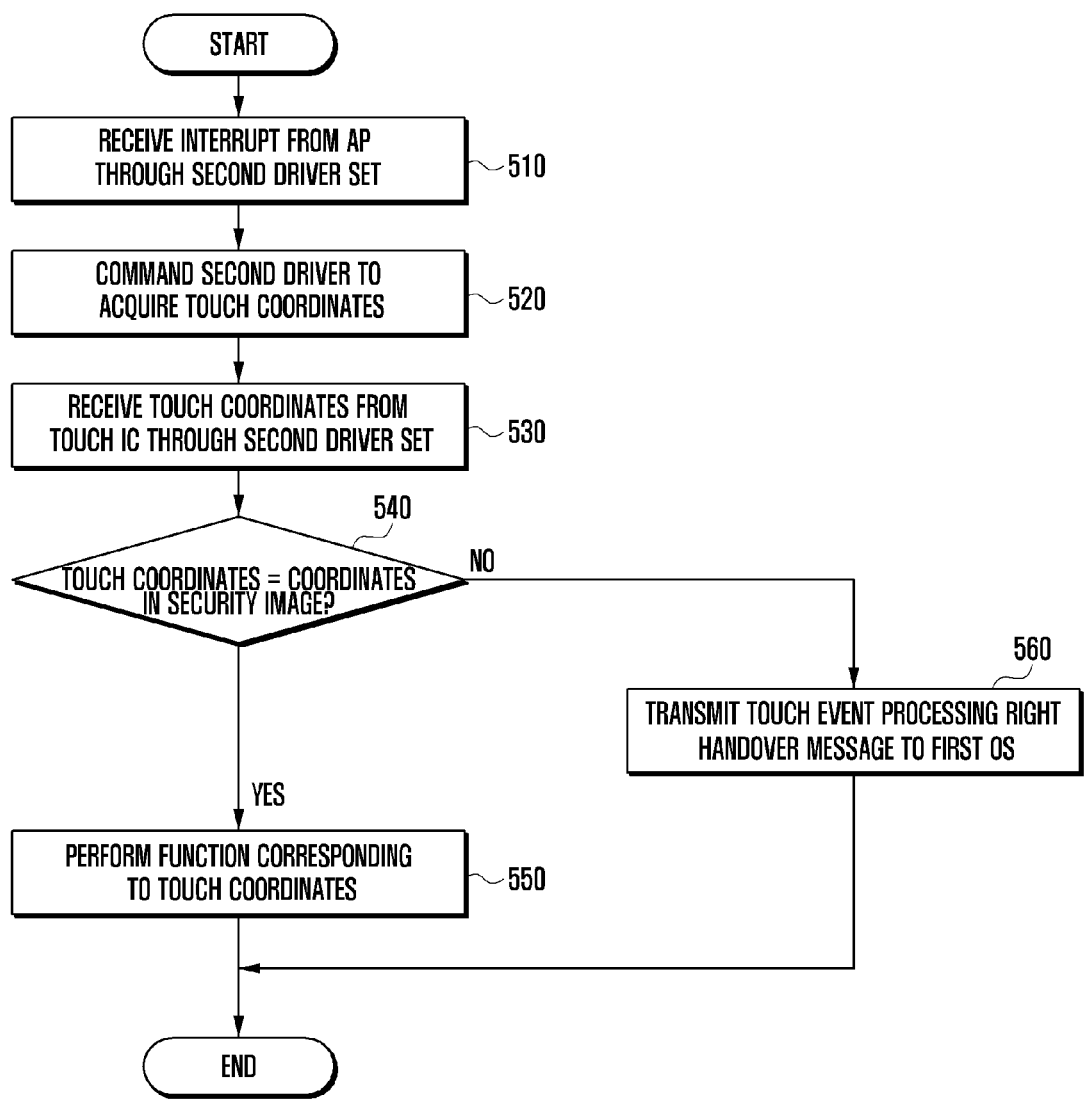
FIG. 5 is a block diagram illustrating the touch event processing method according to an embodiment of the present invention.
Figure 6:
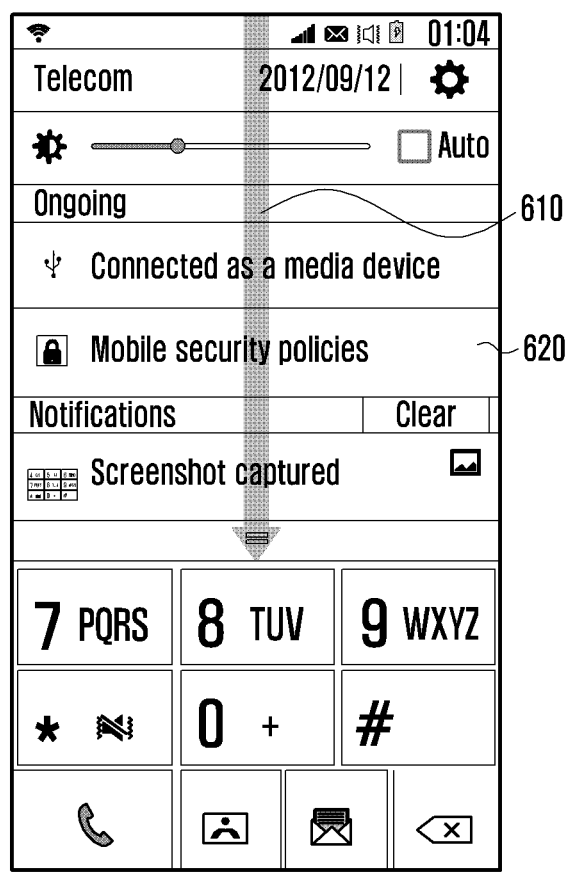
FIG. 6 is a diagram illustrating an exemplary screen display for explaining the touch event processing method of FIG. 5.

FIG. 5 is a block diagram illustrating a touch event processing method according to an embodiment of the present invention. FIG. 6 is a diagram illustrating an exemplary screen display for explaining the touch event processing method of FIG. 5.

Referring to FIGS. 5 and 6, initially, the security image is displayed on the screen, and the second OS 250 has the right of processing the current touch event and knows the display area of the security image based on the display area information stored in the secondary memory 130. In this state, when a new touch input is detected, the second OS 250 receives an interrupt from the AP 161 through the second driver sets 260 at step 510. This interrupt is to allow the newly detected touch coordinates to be transmitted to the second OS. The second OS 250 commands the second driver set 260 to acquire the touch coordinates in response to the interrupt at step 520. The second OS 250 receives the touch coordinates from the touch IC 113 through the second driver set 260 at step 530. The second OS 250 then determines whether the touch coordinates are the coordinates in the security image at step 540.

If the touch coordinates are the coordinates in the security image, the second OS 250 performs the function corresponding to the touch coordinates at step 550. That is, the second OS 250 sends the touch coordinates to the second security application, where they are processed.

Depending on the application, while the security image such as 420 in FIG. 4 is displayed, another region of the screen such as 410 may be designated to accept non-security type inputs to command other operations. For instance, the screen of FIG. 4 may be designed to allow a user to touch region 410 and make a downward drag gesture, as shown in FIG. 6, thereby revealing sub-menus for settings. Accordingly, in the method of FIG. 5, if the detected touch coordinates are not the coordinates in the security image, the second OS sends the first OS 220 a processing right handover message for the touch panel 112 at step 560. The processing right handover message is transferred to the first OS 220 through the OS monitor 270. At this time, the touch coordinates are the coordinates requiring no security (e.g., coordinates of the indicator region 410) and thus transmitted to the first OS 220 in the processing right handover message. If the processing right is handed over by the second OS 250, the first OS 220 commands the first driver set 230 to acquire the touch coordinates. In response, the first driver set 230 receives the touch coordinates from the touch IC 113 and performs a function corresponding to the touch coordinates (according to commands of the first OS 220). In the exemplary case of FIG. 6, the first OS 220 receives the touch coordinates from the touch IC 113 through the first driver set 230. The first OS 220 determines that the user gesture made on the screen is a 'drag' 610 based on the received touch coordinates and displays an extended indicator region 620 according to the direction of the drag 610.

Figure 7:
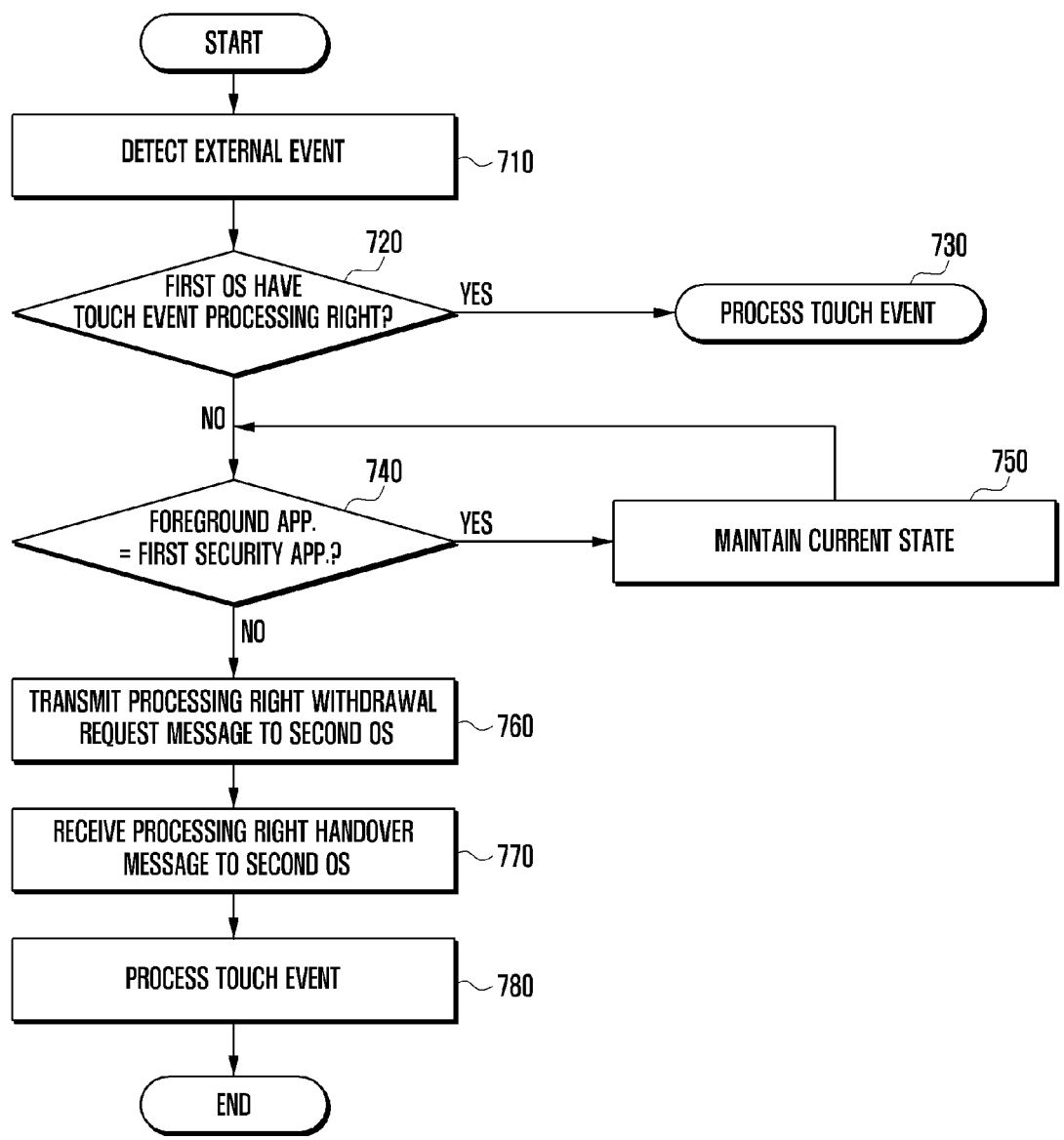
FIG. 7 is a flowchart illustrating a touch event processing method according to another embodiment of the present invention.

FIG. 7 is a flowchart illustrating a touch event processing method according to another embodiment of the present invention. Initially, an external event is detected at step 710. For example, the radio communication unit 140 receives a telephony request event from another terminal through a radio network (e.g. via a base station) and transfers the telephony request event to the AP 161. The AP 161 transfers the telephony request event to the radio communication driver 234 of the OS having the right of processing the telephony, i.e. the first (main) OS 220. The radio communication driver 234 transfers the telephony request event to the first OS 220. In response, the first OS 220 commands the AP 161 to display an incoming call notification image. The display panel 111 displays the incoming call notification image under the control of the AP 161. The external event may be the event notifying of the receipt of any of a Social Network Service (SNS) message, Short Message Service (SMS) message, and Multimedia Message Service (MMS) message, and an event of notifying an available update of a third party application. The external event also may be an event which occurs at an application. For example, the external event may be a clock application generating an alarm event to the first OS 220 when a preset alarm time has arrived.

If an external event is detected, the first OS 220 determines whether it has the right of processing a subsequent touch event at step 720. For example, the first OS 220 accesses the memory (e.g. register) in which the indication value is recorded to check the OS having the right of processing the current touch event. If it has the right of processing the touch event, the first OS 220 processes the touch event at step 730.

If the first OS 220 does not have the right of processing the touch event (i.e., the first security app 210 was previously executed which transferred the touch event processing right to the second OS 250), it determines whether a foreground image ("foreground application") is the first security application 210 at step 740. That is, the first OS 220 determines whether any image related to the external event is displayed on the screen. If no external event-related image is displayed, the first OS 220 maintains the current state at step 750. This means that the second OS 250 has the right of processing the touch event.

If an external event-related image (e.g. incoming call notification image) is displayed, the first OS 220 sends the second OS 250 a touch event processing right withdrawal request message at step 760. Here, the external event-related image may be displayed on the security image or an area where the security image is not displayed. The request message is transferred to the second OS 250 through the OS monitor 270.

Next, the first OS 220 receives the processing right handover message from the second OS 250. Here, the processing right handover message is transferred to the first OS 220 through the OS monitor 270.

If the processing right handover message is received, the first OS 220 processes the touch event at step 780.

Figure 8:
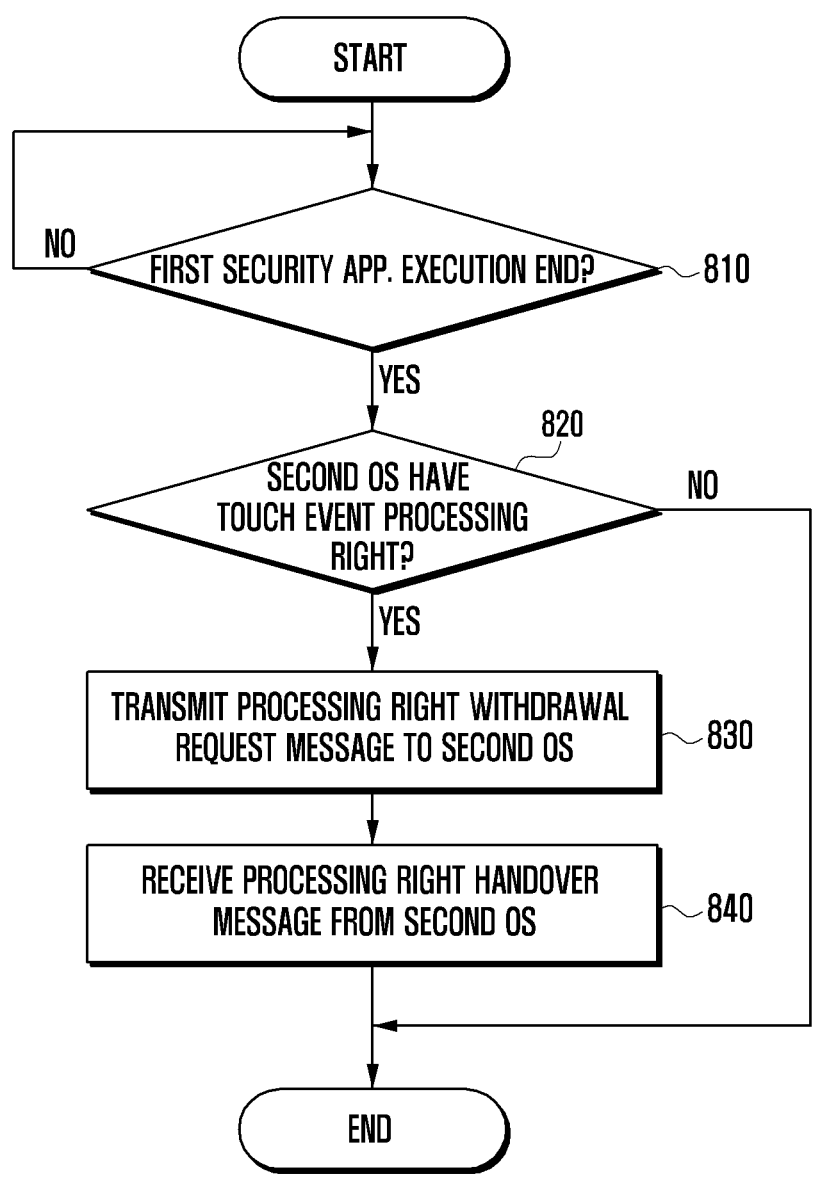
FIG. 8 is a flowchart illustrating a touch event processing method according to another embodiment of the present invention.

FIG. 8 is a flowchart illustrating a touch event processing method according to another embodiment of the present invention. Initially, the first OS 220 determines whether the execution of the first security application 210 is terminated at step S810. If the execution is terminated, this means that the first security application 210 is unloaded from the main memory unit 162. If so, the first OS 220 determines whether the second OS 250 has the touch event processing right at step 820. If yes, the first OS 220 sends the second OS 250 a processing right withdrawal message at step 830. Here, the request message is transferred to the second OS 250 through the OS monitor 270. Next, the first OS 220 receives the processing right handover message from the second OS 250 at step 840. Here, the processing right handover message is transferred to the first OS 220 through the OS monitor 270. The first OS 220 then commands the first driver set 230 to acquire an interrupt and touch coordinates in response to the processing right handover message.

The above-described touch event processing methods according to embodiments of the present invention can be implemented through computer-executable program commands which are stored in a non-transitory computer-readable storage medium. The computer readable storage medium may store the program commands, data files, and data structures in individual or combined forms. The program commands recorded in the storage medium may be designed and implemented for various exemplary embodiments of the present invention or used by those skilled in the computer software field. The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The program commands include the language code executable by computers using an interpreter as well as the machine language codes created by a compiler. The aforementioned hardware device can be implemented with one or more software modules for executing the operations of the various exemplary embodiments of the present invention.

The touch event processing method and portable device implementing the same can be practiced with various modifications without departing from the spirit and scope of the present invention.

What is claimed is:

1. A touch event processing method of a portable device having a first operating system and a second operating system, the method comprising:
   receiving, by the first operating system, touch coordinates from a touch panel; and
   if a function corresponding to the touch coordinates is to execute a security application, transmitting a touch event processing right handover message to the second operating system, for handover of a right of processing a touch event on the touch panel to the second operating system;
   wherein the first operating system transmits, when the security application stops running, a touch event processing right withdrawal request message to the second operating system, and commands, when the touch event processing right handover message is received from the second operating system, a CPU to transmit the touch coordinates.

2. The method of claim 1, further comprising:
   determining, when an external event is detected, whether the second operating system has the touch event processing right;
   transmitting, when the second operating system has the touch event processing right, a touch event processing right withdrawal request message from the first operating system to the second operating system; and receiving, by the first operating system, another touch event processing right handover message from the second operating system.

3. The method of claim 2, further comprising displaying an image related to the external event on a screen.

4. The method of claim 3, wherein the image related to the external event is displayed on one of an image related to the security application and an area where no security application-related image is displayed.

5. The method of claim 1, further comprising:
transmitting, when the security application stops running, a touch event processing right withdrawal request message to the second operating system; and
receiving, by the first operating system, another touch event processing right handover message from the second operating system.

6. A touch event processing method of a portable device having a first operating system and a second operating system, the method comprising:
receiving, at the second operating system, touch coordinates from a touch panel;
determining whether the touch coordinates are coordinates in a security image displayed on the touch panel; and
transmitting, when the touch coordinates are not the coordinates in the security image, a touch event processing right handover message for handover of a right of processing a touch event on the touch panel to the first operating system.

7. The method of claim 6, further comprising transmitting, when the touch coordinates are not the coordinates in the security image, the touch coordinates to the first operating system.

8. A touch event processing method of a portable device having multiple operating systems, the method comprising:
receiving an interrupt from a touch panel;
determining an operating system having a right of processing a touch event among the multiple operating systems;
generating the interrupt to the operating system having the right of processing the touch event; and
transmitting touch coordinates to the operating system to which the interrupt was transmitted, in response to a touch coordinates request message received from the operating system.

9. The method of claim 8, further comprising:
receiving a processing right change command message from the operating system to which the touch coordinates were transmitted; and
changing the operating system for processing the touch event in response to the processing right change command message.

10. A portable device comprising:
a touchscreen having a display panel and a touch panel;
a memory for storing a security application, a first operating system, and a second operating system; and
a Central Processing Unit (CPU) which accesses the memory to execute the first and second operating systems,
wherein the first operating system receives touch coordinates from the touch panel, and transmits, in response to a determination that a function corresponding to the touch coordinates is to execute a security application, a touch event processing right handover message for handover of a right of processing a touch event on the touch panel to the second operating system; and
wherein the first operating system transmits, when the security application stops running, a touch event processing right withdrawal request message to the second operating system, and commands, when the touch event processing right handover message is received from the second operating system, the CPU to transmit the touch coordinates.

11. The portable device of claim 10, wherein the first operating system determines, when an external event is detected, whether the second operating system has the touch event processing right, transmits, when the second operating system has the touch event processing right, a touch event processing right withdrawal request message to the second operating system, and commands, when the touch event processing right handover message is from the second operating system, the CPU to transmit the touch coordinates.

12. The portable device of claim 11, wherein an image related to the external event is displayed on the display panel.

13. The portable device of claim 12, wherein the image related to the external event is displayed on one of an image related to the security application and an area on the display panel where no security application-related image is displayed.

14. The portable device of claim 10, wherein an interrupt to the operating system having the right of processing the touch event is generated; and the touch coordinates are transmitted to the operating system to which the interrupt was transmitted, in response to a touch coordinates request message received from the operating system.

15. The portable device of claim 14, comprising first and second driver sets, wherein the interrupt is provided to the first operating system via the first driver set when the first operating system has the touch event processing right, and the interrupt is provided to the second operating system via the second driver set when the second operating system has the touch event processing right.

16. The portable device of claim 15, wherein each of the firs and second driver sets includes a radio communication unit device driver to drive a radio communication unit of the portable device, the portable device transmitting through the radio communication unit driven by the radio communication unit device driver of the second operating system when the second operating system has the touch event processing right.

17. The portable device of claim 10, further comprising an operating system monitor, wherein the touch event processing right handover message is provided from the first operating system to the second operating system via the operating system monitor.

18. The portable device of claim 10, wherein the first operating system s a main operating system and the second operating system is a sub-operating system.

* * * * *

UNITED STATES PATENT AND TRADEMARK OFFICE
CERTIFICATE OF CORRECTION

PATENT NO.        : 9,310,926 B2
APPLICATION NO.   : 14/140107
DATED             : April 12, 2016
INVENTOR(S)       : Seungmin Chung It is certified that error appears in the above-identified patent and that said Letters Patent is hereby corrected as shown below:

In the Claims

Column 14, Claim 16, Lines 42-43 should read as follows:
--...of the first and...--

Column 14, Claim 18, Line 55 should read as follows:
--...system is a main...--

Signed and Sealed this
Seventh Day of June, 2016

Michelle K. Lee
*Director of the United States Patent and Trademark Office*